United States Patent [19]

Bliefert et al.

[11] Patent Number: 4,536,266

[45] Date of Patent: Aug. 20, 1985

[54] PROCESS FOR THE FLUORINATION OF A SURFACE LAYER OF FORMED BODIES MADE OF PLASTICS

[75] Inventors: Claus Bliefert, Schöppingen; Hans-Michael Boldhaus, Bad Bentheim; Manfred Hoffmann, Ochtrup, all of Fed. Rep. of Germany

[73] Assignee: Hewing GmbH & Co., Ochtrup, Fed. Rep. of Germany

[21] Appl. No.: 558,796

[22] Filed: Dec. 7, 1983

[30] Foreign Application Priority Data

Dec. 11, 1982 [DE] Fed. Rep. of Germany ....... 3245915

[51] Int. Cl.$^3$ ................................................. C08F 8/22
[52] U.S. Cl. ........................... 204/159.18; 525/331.6; 525/333.1; 525/334.1; 525/344; 525/356; 525/358; 525/418; 525/419; 525/420; 525/435
[58] Field of Search ............... 525/356, 358, 344, 418, 525/419, 420, 435; 204/159.18

[56] References Cited

U.S. PATENT DOCUMENTS

| | | | |
|---|---|---|---|
| 3,598,708 | 8/1971 | Jackson, Jr. ........................ | 525/358 |
| 4,142,032 | 2/1979 | D'Angelo ............................ | 525/356 |
| 4,296,151 | 10/1981 | Boultinghouse .................... | 525/358 |

*Primary Examiner*—Bernard Lipman
*Attorney, Agent, or Firm*—Felfe & Lynch

[57] ABSTRACT

Method for the fluorination of a surface layer of articles molded from plastic, vulcanized rubber or other such macromolecular substances by the exposure of at least a part of the article's surface to a fluorine-yielding liquid in a controllable reaction, the liquid consisting of a solvent or solvent mixture containing dissolved elemental fluorine. Suitable solvents are especially halogen hydrocarbons in accordance with DIN 8962, which are liquid within a temperature range from $-30°$ C. to $+10°$ C., but also water and solvents having perfluoroalkyl groups. The liquid, in which a fluorine concentration between $0.5 \times 10^{-3}$ and $1 \times 10^{-2}$ mol/l is established by the introduction of fluorine diluted with inert gas, is used to treat the articles for about 20 seconds to 30 minutes; the fluorine can be activated if desired. The liquid can additionally contain sulfur dioxide, oxygen, carbon monoxide, chlorine, bromine, or mixtures thereof.

16 Claims, No Drawings

PROCESS FOR THE FLUORINATION OF A SURFACE LAYER OF FORMED BODIES MADE OF PLASTICS

Priority is claimed in this application under 35 U.S.C. 119 on the basis of German Pat. No. P 32 45 915.7 application, filed Dec. 11, 1982.

The invention relates to a method of fluorinating a surface layer of articles molded from fluorinatable organic plastics, vulcanized rubber or other such macromolecular substances by exposing at least a portion of the body's surface to a fluorine-yielding liquid in a controllable reaction.

It is known from Soviet Union Pat. No. 330,177 (referenced in DE-AS No. 2,328,037) to treat the surface of molded rubber bodies by immersion in a bath containing liquid antimony pentafluoride as fluorinating agent. The treatment is followed by three washings, one of them with a 5 to 20% aqueous solution of alkali metal carbonate. A disadvantage of this method is a very great loss of antimony pentafluoride upon the removal of the molded article. Letting the liquid drain off from the article results in an irregular fluorination, and even in its destruction. The application of the known method on a large technical scale is considered to be unprofitable.

The problem poses itself of devising a method for the fluorination of a surface layer of molded articles, in which a controllable, economical and repeatable fluorination reaction can be performed in a bath or by some other method of exposing them to a fluorine-yielding liquid, for example by rocking them in a container filled with such liquid.

This problem is solved in a method of the kind described in the beginning by making the liquid to consist of a solvent or mixture of solvents containing absorbed or dissolved elemental fluorine, in which the solvent or solvent mixture itself reacts but slightly or not at all with fluorine, leaves the surface of the article substantially unaffected, and has a liquid phase at least within a temperature range in which a fluorination reaction takes place controllably, in which substantially elemental fluorine reacts with the material of the surface layer during the exposure of the article to the liquid.

This method using a liquid which contains elemental fluorine, i.e., dissolved or in the form of finely divided bubbles, differs essentially from a process in which fluorine reacts in the gaseous phase. Here a very extensive state of the art is known (cf. U.S. Pat. Nos. 3,862,284, 3,988,491, and 4,020,223, the periodical "Plaste u. Kautschuk", 24 (1977) 617, and additional information obtainable therefrom). Treatment in the gaseous phase entails great safety hazards, since the reaction heat is considerable and can be removed only with great difficulty. If it is desired to keep the time of exposure to the liquid within reason and to avoid degradation of the plastic, changes in temperature and fluorine concentration must be kept within narrow limits. In general, long exposure times are necessary in gas-phase fluorination on account of the relatively small fluorine content in the mixture of fluorine and inert gas, in order to achieve the desired modification of the plastic surface. Even so, it is impossible to fluorinate surface layers with repeatable uniformity, on account of unavoidable local overheating. Also, these processes are not very suitable for the continuous fluorination of individual articles. Furthermore, waste disposal is a problem, and it is relatively difficult to comply with emission control regulations.

The method of the invention avoids the above-described disadvantages of gas-phase fluorination. By this method it is possible to immerse bodies in a vat of liquid containing elemental fluorine, or to fill them with it (in the case of tubes, containers and the like); the time of exposure can be measured very accurately.

Suitable solvents are especially liquid halogenated hydrocarbons (aliphatic and cycloaliphatic hydrocarbon compounds of low molecular weight, which are usually completely substituted by chlorine and/or fluorine). Such halogenated hydrocarbons are listed and classified, for example, in DIN 8962. The selection of these halogenated hydrocarbons as suitable solvents is based essentially on economic considerations, and on whether they are liquid within the temperature range from $-30°$ C. and $+10°$ C. From this point of view, trichlorofluoromethane, dibromodifluoromethane, 1,1,2-trichlorotrifluorethane, 1,2-dibromotetrafluorethane or 1,1-dichlorodifluorethylene, or mixtures thereof, are especially suitable.

It is especially advantageous that, with solvents such as these, it is possible to operate with temperatures in the neighborhood of $-20°$ C. The reaction heat produced during the fluorination is easily removed by the very cold liquid.

In the fluorination method of the invention, it is surprising that, by means of the solvents used, a swelling of the plastic surface is achieved which promotes the penetration of fluorine. The surface of the bodies can thus be improved much more intensively than in gas-phase fluorination. At the same time, the bodies being exposed are treated gently.

Even water can be used as solvent. Water does react with fluorine at low temperatures to produce various compounds, but some of these in turn produce a fluorinating action. Fluorination in water as solvent, however, must remain limited to special plastics.

The fluorine content in the liquid is standardized by the continuous, controlled maintenance of the fluorine gas content, preferably with the admixture of a suitable fluorine-inert gas, such as nitrogen or helium, for example, which are mixed in a ratio from 1:5 to 1:100, preferably 1:10. The gas mixture can also be prechilled.

It has been found that a number of physical properties of the plastic articles can be still further improved if, in addition to fluorine, other gases are dissolved in the solvent or solvent mixture, examples being sulfur dioxide, oxygen, carbon monoxide, carbon dioxide, chlorine, bromine or mixtures of these gases, and if the plastic articles are treated with or in these solutions.

The three parameters, of concentration, temperature and time of exposure, can be varied as follows:

Fluorine Concentration

The fluorine concentration in the liquid can range from $1 \times 10^{-5}$ mol/l to a maximum of saturation, preferably between $0.5 \times 10^{-3}$ to $1 \times 10^{-2}$ mol/l.

Temperature

The fluorination reaction can take place at temperatures between $-70°$ C. and the boiling temperature of the solvent or solvent mixture, preferably in the range from $-30°$ C. to $0°$ C.

Time of Exposure

The exposure time can be between 1 second and 10 days, preferably between 20 seconds and 30 minutes.

It is apparent that reactions can be performed outside of these limits, if this appears feasible in the opinion of persons skilled in the art, without departing from the scope of the invention.

Examples and descriptions of the reaction will now be given to explain the invention.

EXAMPLE 1

In a closed, fluorine-resistant reactor of a capacity of about 10 liters, a fluorine concentration of $10^{-2}$ mol/l is maintained by the introduction of prechilled fluorine diluted with inert gas. The reactor is filled with trichlorofluoromethane ($CCl_3F$). Polyethylene tubes with an outside diameter of 18 mm and a wall thickness of 2 mm are flushed internally (a) and treated in a bath externally (b) with the above-specified liquid for 15 minutes at $-20°$ C.

Then the tubes are rinsed with caustic soda solution (concentration approximately 1 mol/l) and with water.

Untreated and treated tubes are then tested for permeability to gases, thermal stability of shape, and resistance to cracking and heat aging. The oxygen permeation rate under equal conditions is reduced to less than 0.5% of the original rate. Thermal stability of shape, and resistance to aging, measured by standardized methods, show significant improvement.

Resistance to chemical action and to solvents (e.g., n-pentane, gasoline, lyes and acids) is substantially improved.

EXAMPLE 2

A cylindrical body made from vulcanized natural rubber is immersed for 15 minutes in a bath containing approximately $5 \times 10^{-3}$ mol/l of fluorine in 1,1,2-trichlorotrifluorethane at $-5°$ C. (cooling with dry ice), and thus fluorinated. After washing and drying, the sliding friction number of the fluorinated surface is significantly lower than in the case of untreated rubber.

Other vulcanized rubbers (stereoregular butadiene and isoprene rubbers, butadiene-styrene rubber, chloroprene rubber, ethylenepropylene rubber and copolymers of fluorinated monomers) as well as butadiene-acrylonitrile, can be fluorinated in like manner. Corresponding variation of the parameters of the treatment results in a greater or lesser degree of fluorination and depth of penetration.

EXAMPLE 3

A bottle (capacity 1 liter) made of polyvinyl chloride is treated externally for 60 minutes in a bath of dibromodifluoromethane having a fluorine concentration of approximately $10^{-2}$ mol/l at $0°$ C.

In comparison to an untreated bottle, the resistance to chemicals (e.g., acids, alkalies, oxidants) and solvents (e.g., n-pentane, gasoline, diesel fuel) is substantially improved. Furthermore, gas permeability is almost entirely eliminated.

EXAMPLE 4

A polypropylene film (thickness 0.1 mm) is immersed in a bath of carbon tetrachloride in which the fluorine concentration is maintained by means of a prechilled mixture of fluorine and nitrogen gas (ratio 1:50 by volume) at approximately $10^{-3}$ mol/l. After the treatment, the film is washed with water and then dried in a current of warm air.

After a fluorination of only 15 minutes, a reduced permeability to water vapor and oxygen can be measured.

EXAMPLE 5

Several polyethylene sheets 1.5 mm thick are immersed in a bath of perfluorobutanesulfonylfluoride ($C_4F_9SO_2F$) through which a mixture of fluorine and helium gas (1:20) is passed. The bath temperature is adjusted to $-5°$ C. Samples taken at regular intervals of time show a continuous lowering of the friction number and raising of the degradation temperature.

EXAMPLE 6

A mixed stream of fluorine and nitrogen gas (1:10) is passed at $0°$ C through dibromodifluoromethane, instead of the bath liquid specified in Example 5, until saturation is reached. The fluorination is performed on polyethylene sheets as in Example 5 for about 20 minutes, and the result is improved friction numbers as in Example 5.

EXAMPLE 7

A mixture of fluorine and nitrogen gas (1:50) is passed for one hour at $-20°$ C. through 1,2-dibromotetrafluorethane instead of the bath liquid specified in Example 5. Polyethylene sheets are fluorinated as in Example 5. The friction numbers improve.

EXAMPLE 8

An injection-molded article of polyamide (PA 6.6) is immersed in a vat filled with water, through which a mixture of fluorine and nitrogen gas (1:10) is finely bubbled for about 6 hours, with stirring. The bath temperature is $0°$ C.

The article thus treated has a considerably improved resistance to abrasion.

EXAMPLE 9

A polyethylene canister (capacity 5 liters), which is chilled to $-20°$ C., is filled with trichlorofluoromethane, in which approximately $10^{-2}$ mol/l of fluorine gas is dissolved. The canister, filled to 80 to 90% of its capacity, is closed and shaken for 10 minutes at $120°$ C.

In the vessel treated in this manner, the permeability to n-pentane is several times lower.

EXAMPLE 10

In the procedure of Example 1, the bath is photoactivated by means of an ultraviolet fluorescent lamp during the exposure. The exposure time can thus be shortened under otherwise the same experimental parameters.

EXAMPLE 11

In the procedure of Example 1, the bath is treated with an ultrasonic source during the exposure of the article, the energy density being adjusted such that no outgassing of the liquid is observed. This treatment too can reduce the exposure time under otherwise the same experimental parameters.

EXAMPLE 12

A bath of 1,1,2-trichlorotrifluoroethane is saturated at room temperature with a mixture of 5% fluorine gas, 5% sulfur dioxide, and 90% nitrogen, by volume. A polyethylene bottle is treated inside and out with this solution. After this treatment, the capacity for retention of solvents is more than 10% better than in the case of treatment with a solution containing only fluorine. Additions of 2 to 25% of oxygen, up to 25% of sulfur dioxide or carbon monoxide, up to 50% of carbon dioxide and/or up to 50% of chlorine or bromine or mixtures thereof, by volume, together with an inert carrier gas and the reactive fluorine gas, act in a similar manner.

We claim:

1. Method for fluorinating surface layers of articles molded from macromolecular polymeric materials capable of being fluorinated which comprises exposure of at least a portion of said article to a fluorine-containing liquid consisting essentially of elemental fluorine dissolved in a solvent or solvent mixture which are essentially inert with respect to fluorine and said article and reacting said elemental fluorine with said surface layers.

2. Method of claim 1 wherein said solvents are halogenated hydrocarbons.

3. Method of claim 2 wherein said solvents are selected from the group consisting of tricholorofluoromethane, dibromodifluoromethane, 1,1,2- trichlorofluoromethane, 1,2-dibromotetrafluoromethane, 1,1- dichlorodefluorethylene and carbon tetrachloride.

4. Method of claim 1 wherein said solvents contain perfluoroalkyl groups.

5. Method of claim 1 wherein said solvent is water.

6. Method of claim 1 wherein the fluorine content of the liquid is standardized by the controlled introduction of fluorine gas.

7. Method of claim 6 wherein the fluorine gas is introduced with the admixture of an inert gas.

8. Method of claim 1 wherein the fluorine concentration in the solvent is in a range from $1 \times 10^{-5}$ mol/l to a maximum of saturation.

9. Method of claim 8 wherein the fluorine concentration in the solvent is in a range of $0.5 \times 10^{-3}$ and $1 \times 10^{-2}$ mol/l.

10. Method of claim 1 wherein the fluorination is performed at a temperature between $-70°$ C. and the boiling temperature of the solvent or solvent mixture.

11. Method of claim 10 wherein the temperature range of the fluorination reaction is $-30°$ C. to $0°$ C.

12. Method of claim 1 wherein the time of exposure is between 1 sec. and 10 days.

13. Method of claim 12 wherein the time of exposure is between 20 sec. to 30 min.

14. Method of claim 1 wherein the fluorine-containing liquid is photoactivated during exposure of the article.

15. Method of claim 1 wherein the fluorine-containing liquid is subjected to ultrasound during exposure of the article.

16. Method of claim 1 wherein a gas selected from the group consisting of oxygen, sulphur dioxide, carbon monoxide, carbon dioxide, chlorine, bromine and mixtures thereof is present with the elemental fluorine inert gas mixture as it is introduced into the solvent or solvent mixture.

* * * * *